United States Patent [19]

Morel et al.

[11] 4,418,753

[45] Dec. 6, 1983

[54] METHOD OF ENHANCED OIL RECOVERY EMPLOYING NITROGEN INJECTION

[75] Inventors: Thomas J. Morel; Stewart Haynes, Jr., both of Houston, Tex.

[73] Assignee: Texaco Inc., White Plains, N.Y.

[21] Appl. No.: 297,804

[22] Filed: Aug. 31, 1981

[51] Int. Cl.$^3$ ............................................. E21B 43/22
[52] U.S. Cl. ..................................... 166/273; 166/268
[58] Field of Search ............... 166/266, 267, 268, 273, 166/274

[56] References Cited

U.S. PATENT DOCUMENTS

| | | | |
|---|---|---|---|
| 2,386,036 | 10/1945 | Cross | 166/266 |
| 2,718,262 | 9/1955 | Binder, Jr. | 166/268 |
| 3,065,790 | 11/1962 | Holm | 166/274 |
| 3,209,824 | 10/1965 | Koch, Jr. et al. | 166/268 |
| 3,245,467 | 4/1968 | Fitch | 166/273 |
| 3,386,506 | 6/1968 | Quance | 166/273 |
| 3,811,501 | 5/1974 | Burnett et al. | 166/273 X |
| 3,854,532 | 12/1974 | Braden, Jr. | 166/273 X |
| 4,136,738 | 1/1979 | Haynes, Jr. et al. | 166/273 |
| 4,299,286 | 11/1981 | Alston | 166/274 |

*Primary Examiner*—Stephen J. Novosad
*Assistant Examiner*—George A. Suchfield
*Attorney, Agent, or Firm*—Carl G. Ries; Jack H. Park

[57] ABSTRACT

Disclosed is a Process for the recovery of oil from a subterranean oil reservoir by miscible displacement. An initial light hydrocarbon slug is injected into the reservoir at a rate which results in fingering of the hydrocarbon through the reservoir oil to produce a light hydrocarbon-reservoir oil mixture. Thereafter, a predominantly nitrogen containing gas is injected into the reservoir at a rate resulting in a flow velocity which is less than the velocity of the previously injected light hydrocarbon. Injection of the nitrogen containing gas strips the previously injected light hydrocarbon from the oil to form a transition zone of conditional miscibility. The miscible zone is then displaced through the reservoir by injection of a suitable driving agent. By injecting the light hydrocarbon slug, the path length through the reservoir needed to establish the conditionally miscible transition zone at the reservoir conditions of temperature and pressure can be materially decreased.

24 Claims, No Drawings

METHOD OF ENHANCED OIL RECOVERY EMPLOYING NITROGEN INJECTION

FIELD OF THE INVENTION

This invention relates to the recovery of oil from subterranean oil reservoirs and more particularly, to enhanced oil recovery operations in which nitrogen and light hydrocarbons are injected into the reservoir to achieve conditionally miscible displacement of the oil therein.

BACKGROUND OF THE INVENTION

In the recovery of oil from oil bearing reservoirs, it usually is possible to recover only minor portions of the original oil in place by the so-called primary recovery methods which utilize only the natural forces present in the reservoir. Thus, a variety of supplemental recovery techniques have been employed in order to increase the recovery of oil from subterranean reservoirs. These supplemental techniques, commonly referred to as "enhanced oil recovery," involve the injection of a fluid, or series of fluids, into the reservoir through an injection system comprised of one or more wells. As the injected fluid moves through the reservoir, it acts to displace the oil therein, to a production system composed of one or more wells through which the oil is recovered. One type of enhanced oil recovery procedure involves miscible flooding in which an oil miscible solvent is injected into the formation. The solvent is forced through the formation by a suitable driving fluid, which may be gaseous or liquid depending upon the nature of the solvent, and acts to displace the oil to the production system. The miscible displacement mechanism may involve "first contact miscibility" or "conditional miscibility". In first contact miscibility, the miscible displacing agent normally takes the form of a light hydrocarbon slug such as pentane, propane or butane, or mixtures of such hydrocarbons, commonly termed "liquified petroleum gas" (LPG). The injected liquid hydrocarbon is capable of forming a single phase with the reservoir oil at the reservoir conditions immediately upon contact therewith. In conditional miscibility, a miscible transition zone is formed in the reservoir as a result of repeated contact of the reservoir oil by an injected high pressure gas. The transition zone of conditional miscibility may be formed of light hydrocarbons from an injected enriched gas, or light hydrocarbons may be stripped from the reservoir oil by an injected lean gas

PRIOR ART

A number of procedures for oil recovery by conditionally miscible displacement which involve the injection of carbon dioxide under a suitable high pressure are described in the literature. The carbon dioxide may be employed alone or in conjunction with other materials to establish a conditionally miscible transition zone within the reservoir. As disclosed in U.S. Pat. No. 4,136,738 to Haynes et al., carbon dioxide may be injected into the reservoir subsequent to the injection of a light hydrocarbon. The light hydrocarbon slug, e.g. a mixture of $C_2$–$C_6$ aliphatic hydrocarbons, is injected at a rate in excess of a "critical velocity" to ensure mixing of the light hydrocarbon with the reservoir oil. As a result of this mixing, the reservoir oil is altered such that it is conditionally miscible with the subsequently-injected carbon dioxide at the reservoir temperature and pressure. Thereafter the carbon dioxide is injected at a relatively low rate which is less than the critical velocity in order to form the conditionally miscible transition zone.

Various so-called inert gases may be employed to establish oil displacement by conditional miscibility. For example, a paper by M. D. Rushing et al, entitled "Miscible Displacement with Nitrogen," Petroleum Engineer, November 1977, pp. 26–30, describes a miscible oil displacement process involving the injection of high pressure nitrogen. As disclosed by Rushing et al, pure nitrogen is injected into the reservoir and functions to initially strip relatively low molecular weight hydrocarbons from the reservoir oil. As the light hydrocarbons are absorbed, a two-phase equilibrium point is established between the reservoir oil and the nitrogen at a location near the injection well. The liquid phase is composed initially of significant quantities of light and heavy residual hydrocarbons, whereas the gas phase is comprised primarily of nitrogen and light hydrocarbons. Since the gas phase has a higher mobility within the reservoir, it moves ahead of the liquid phase to contact additional reservoir oil. As nitrogen injection continues, the liquid phase is contacted with additional nitrogen with an attendant decrease in the concentration of light hydrocarbons in the liquid phase until ultimately the liquid phase is reduced to the heavy residual hydrocarbons.

Nitrogen and carbon dioxide may also be employed in admixture with one another or with other gases. For example, U.S. Pat. No. 3,811,501 to Burnett et al, disclosed an oil displacement process employing conditional miscibility in which the injected fluid comprises carbon dioxide and an inert gas having a solubility in the reservoir oil which is less than that of the carbon dioxide. Examples of inert gases which may be employed in the Burnett et al., process includes methane, natural gas, separator gas, flue gas, nitrogen and air.

In copending application Ser. No. 152,072, filed May 21, 1980 now U.S. Pat. No. 4,299,286, for "Enhanced Oil Recovery Employing Blend of Carbon Dioxide, Inert Gas and Intermediate Hydrocarbons," R. B. Alston, there is disclosed a method for recovering oil from dipping reservoirs by injecting a gaseous fluid which is predominantly carbon dioxide, with sufficient nitrogen or other inert gas blended therewith to adjust the gas density downward to a desired value, plus sufficient intermediate hydrocarbons to achieve at least conditional or multiple contact miscibility with the formation petroleum at reservoir conditions.

SUMMARY OF THE INVENTION

In accordance with the present invention, there is provided a new and improved miscible flood process involving the injection of nitrogen and a light hydrocarbon into an oil bearing reservoir to establish a transition zone of conditional miscibility within the resevoir. In carrying out the invention, an initial hydrocarbon slug is injected into the reservoir via a suitable injection system. The light hydrocarbon slug is injected at a rate sufficient to cause fingering of the light hydrocarbon through the reservoir oil. Thus, a mixture of the light hydrocarbon and reservoir oil is formulated adjacent the injection system. Subsequent to injection of the light hydrocarbon slug, a predominantly nitrogen-containing gas is introduced into the reservoir via the injection system. The nitrogen containing gas is injected at a rate to produce a flow velocity within the formation which is less than the velocity of the previously injected light hydrocarbon. The injection of the predominantly nitrogen-containing gas is continued at this relatively low rate and in amounts sufficient to strip the previously injected light hydrocarbon from the reservoir oil and form a transition zone of conditional miscibility within the reservoir. The process is carried to conclusion by the injection of a gaseous driving fluid into the reservoir to displace the oil therein to a suitable production system from which it is recovered.

DESCRIPTION OF SPECIFIC EMBODIMENTS

As noted previously, the injection of nitrogen gas can, under appropriate circumstances, result in the establishment of a miscible transition from the reservoir oil. In order for the injected nitrogen to become sufficiently rich with the relatively low molecular weight hydrocarbons to establish miscibility, a number of successive contacts of the enriched nitrogen and the reservoir oil must occur. The movement of the gas and liquid phases through the reservoir may be characterized as involving a chromatographic transport mechanism which produces gas-liquid chromatographic separation in the reservoir sand. The stripping of light to intermediate hydrocarbons from the reservoir oil with the attendant enrichment of the injected nitrogen may be defined in terms of this chromatographic separation effect. Thus, the enrichment of the injected nitrogen can be related to the number of theoretical plates required for the attainment of gas-liquid equilibrium. By analogizing the reservoir sand to a packed column, the equivalent length of reservoir sand required for the attainment of gas-liquid equilibrium may be explained in terms of the "height equivalent to a theoretical plate" (HETP), familiar to those skilled in the art of liquid-vapor fractionation. The HETP is a function of the reservoir characteristics and is constant for a given reservoir. The number of equilibrium contacts between the gas and the reservoir oil multiplied by the HETP gives the length of the fluid flow path within the reservoir needed to establish sufficient enrichment of the injected nitrogen to produce the in situ transition zone which is miscible in both the gas phase and the reservoir oil. The length of this path at pressures and temperatures normally encountered in subterranean reservoirs is much longer for nitrogen than for carbon dioxide. For example, for a typical reservoir oil having a stock tank API gravity of 35.6° at a temperature of 164° F. and 3334 psia, the path length needed to achieve a conditionally miscible state through the injection of pure carbon dioxide would be about 4–5 feet. Where nitrogen, rather than carbon dioxide is employed as the injection gas, the path length needed to establish a conditionally miscible transition zone adjacent the injection system is increased materially to a value on the order of 100 feet or more. In the practice of the present invention, this path length can be materially diminished to enable the use of nitrogen to establish a conditionally miscible transition zone adjacent the injection oil without resort to pressures significantly greater than those normally encountered in subterranean oil reservoirs.

In accordance with the present invention, the reservoir oil in the immediate vicinity of the injection system is altered in a manner to enhance the enrichment process leading to formation of the conditionally miscible transition zone. Increasing the quantity of $C_2$–$C_6$ hydrocarbons, ethane, propane, butane, pentane, hexane and mixtures thereof, in the reservoir oil adjacent the injection well decreases the minimum pressure required to achieve miscibility at the reservoir temperature; or at a given set of reservoir conditions of pressure and temperature, reduces the path length necessary to establish the conditionally miscible transition zone. The initial light hydrocarbon slug is injected at a relatively high rate sufficient to cause fingering of the light hydrocarbon through the reservoir oil. Stated otherwise, the light hydrocarbon slug is injected under conditions producing a high flow velocity which results in inefficient displacement of the reservoir oil. The resultant mixing of the light hydrocarbon with the reservoir oil alters the liquid adjacent the injection well so that miscibility is obtained within a relatively short path length. For example, at the reservoir conditions of 164° F. and 3334 psia noted above, injection of an LPG slug into a 10-acre pattern to modify the reservoir oil within a radius of 15–40 feet from the injection well can reduce this path length to a value of about 4–5 feet. The initially-injected light hydrocarbon may take the form of any suitable hydrocarbon or mixtures thereof, which exhibit a relatively low molecular weight. Thus, suitable hydrocarbons would include low to intermediate molecular weight alkanes such as ethane ranging up to hexane. Where a mixture of hydrocarbons is employed, as will normally be the case, the average molecular weight of the mixture usually will be in the $C_3$–$C_4$ range, i.e. an average molecular weight of about 40–60. Of course, other aliphatic hydrocarbons having similar molecular weights and liquid-vapor phase characteristics may also be employed.

The light hydrocarbon slug may be injected at any suitable rate sufficient to produce the desired mixing zone adjacent the injection system. While the flow velocity of the injected fluid within the formation will depend to some extent upon the gravity characteristics of the reservoir, it usually will be desirable to inject the light hydrocarbon slug at a rate sufficient to produce a darcy velocity (apparent velocity) at the light hycrocarbon slug front of at least 2 feet per day. As will be understood by those skilled in the art, because of the radial flow geometry associated with the flow of fluid from a well into the surrounding reservoir as well as the decrease in the flowing pressure gradient, the flow velocity is extremely high immediately adjacent an injection well and falls off rapidly as the fluid moves to more remote locations in the reservoir. For example, the injected fluid may undergo a tenfold decrease in flow velocity in traveling from a point a few feet from the wall of the injection well to a point of perhaps 20 feet from the well. The velocity values referred to herein are the flow velocities as the would exist at a location in the reservoir about 25 feet from the injection point.

The amount of light hydrocarbon injected will vary depending upon the composition of the reservoir oil, the temperature and conditions of the reservoir oil, and the characteristics of the light hydrocarbon slug itself. Usually it will be preferred to inject the light hydrocarbon slug in an amount within the range of 0.01–0.02 pore volume. In another embodiment the light hydrocarbon slug is injected into the reservoir in an amount equivalent to the pore volume amount of said reservoir within a radial distance of 15–40 feet from each of the wells comprising the injection system.

After the injection of a suitable quantity of the light hydrocarbon, nitrogen is injected in order to establish the transition zone of conditional miscibility adjacent the injection wells. The nitrogen is injected at a rate which produces a darcy velocity less than the velocity of the previously injected light hydrocarbon. Any suitable predominantly nitrogen-containing gas may be employed at this stage of the invention. For example, the injected gas may take the form of substantially pure nitrogen such as produced by cryogenic fractionation of air as described by Rothrock et al, "Nitrogen Floods Need Specialize Surface Equipment," Petroleum Engineer, August 1977, pp. 22–26. The nitrogen containing gas may also take the form of flue gases such as from boilers or internal combustion engines which typically will contain about 88% nitrogen, 10% carbon dioxide, 1% carbon monoxide, and the remainder hydrogen and trace amounts of other gases. In some cases, where the reservoir oil does not contain readily oxidizable components which would be deleterious to the formation of a miscible zone, air (about 78% nitrogen) may be employed as the nitrogen-containing gas to form the conditionally miscible transition zone. The injected nitrogen may also contain other component gases in addition to those noted above. However, nitrogen must be the predominant component in the stripping gas employed in accordance with the present invention and preferably will comprise at least 75% of the injected gas.

As noted previously, the predominantly nitrogen-containing gas is injected at a rate to produce a flow velocity within the formation which is less than the velocity of the previously injected light hydrocarbon slug. The injection of nitrogen is continued at a sufficiently low rate to maintain the transition zone of conditional miscibility formed between the nitrogen and the altered reservoir fluid as it is moved through the reservoir and displaces the oil therein. Usually it will be preferred to inject the nitrogenous gas at a rate resulting in a flow velocity within the reservoir within the range of 0.1–1.0 feet per day.

The nitrogenous gas is injected into the reservoir in an amount sufficient to maintain and propel the transition zone of conditional miscibility through the reservoir to the production system. Preferably, the nitrogenous gas is injected in an amount of at least 0.2–0.4 pore volume and is then followed by a suitable driving fluid which may simply comprise continued injection of the nitrogenous gas or may take the form of some other suitable gas which is compatible with the reservoir oil and the previously injected fluids. For example, the process may be carried out employing cryogenically produced nitrogen injected in an amount within the range of 0.2–0.4 pore volume followed by the injection of air in such amounts as necessary to carry the process to completion. While the process usually will be carried out employing only gas injection, in some instances, a liquid such as water may be employed as part of the driving agent. For example, water may be employed to increase the areal sweep efficiency of the process in the manner of the AGWIP (alternate gas-water injection procedure) technique known to those skilled in the art, or water thickened with a suitable polymeric thickening agent may be injected for mobility control purposes.

The present invention may be carried out utilizing injection and production systems as defined by any suitable arrangement of wells extending from the surface of the earth into the subterranean oil reservoir. The wells may be located and spaced from one another in any desired pattern. One well arrangement commonly used in enhanced oil recovery operations and suitable for use in carrying out the present invention is the integrated five-spot pattern which comprises a plurality of five-spot patterns, each composed of a central production well and four corner injection wells. Another pattern often employed is the inverted five-spot pattern. Other suitable well arrangements which may be used in carrying out the invention include direct or staggered line drive patterns, four-spot, seven-spot, nine-spot patterns or circular flood patterns. For further description of these and other arrangements which may be employed in enhanced oil recovery operations, reference is made to Uren, Petroleum Production Engineering, Oil Field Exploitation, 3rd Ed., McGraw-Hill Book Company, Inc., New York 1953, pp. 528–534. While the well patterns are described in Uren with reference to water flooding operations, it will be recognized that such patterns are also applicable to miscible flooding. The term "pore volume" is used herein to designate the pore volume of the formation underlying the well pattern defined by the wells comprising the injection and production systems.

It is also to be recognized that the invention may be carried out employing one or more dually-completed injection-production wells of the type disclosed, for example, in U.S. Pat. No. 2,725,106 to Spearow. This arrangement may sometimes be utilized to advantage in relatively thick reservoirs in which it is desirable to displace the oil downwardly through the reservoir in a predominantly vertical direction and recover the oil from the lower portion of the reservoir.

The present invention may be carried out in an essentially flat reservoir where the oil displacement is fundamentally horizontal. However, a preferred application of the present invention is in reservoirs having a pronounced dip, i.e. 10° or more, where the gravitational effects due to the density differentials of the various fluids involved may be utilized to advantage. In this case, the light hydrocarbon and nitrogen are injected through one or more wells located up dip from the production wells. It will be understood by those skilled in the art that the term "dipping reservoir" is also meant to include relatively thick reservoirs, which may or may not exhibit a geological dip, but which are completed with wells so that the flow of fluids through the reservoir has a significant vertical component as described above with respect to the patent to Spearow.

The relative mobility of fluids flowing in a reservoir under a given pressure gradient is directly proportional to the relative permeability of the reservoir to the fluids involved and inversely proportional to their viscosities. Accordingly, when a relatively viscous fluid such as reservoir oil is displaced with a fluid of relatively low viscosity, e.g. LPG, the flood front at the interface between the displaced and displacing fluids becomes progressively more unstable as the flow velocity increases. In addition, where a significant density differential exists between the displaced fluid and the displacing fluid, the stability of the flood front can be greatly influenced by gravitational forces. In carrying out a displacement recovery method in a dipping reservoir, the stability of the interface between a relatively dense displaced fluid and a relatively low density displacing fluid is enhanced by gravitational forces in the course of downdip fluid flow having a significant vertical component. Thus, as explained in the aforementioned patent to Haynes et al, for a given set of conditions there is a critical velocity below which downward displacement of the reservoir oil by a relatively low density displacing medium is stabilized by gravitational forces. This critical velocity, $V_c$, may be defined by the following relationship:

$$V_c = (2.741 \kappa \Delta\rho \sin \alpha)/\phi\Delta\mu$$

wherein:

$V_c$ is the critical velocity in feet per day,
$\kappa$ is the permeability of the reservoir in darcies
$\phi$ is the fractional porosity of the reservoir $= \phi_r(1-S_{wr}-S_{or})$,
$\phi_r$ is the porosity of the reservoir,
$S_{wr}$ is the residual water saturation,
$S_{or}$ is the residual oil saturation,
$\alpha$ is the dip angle of the reservoir in degrees,
$\Delta\rho$ is the density differential between the displaced, fluid and the displacing fluid in grams per cubic centimeter, and
$\Delta\mu$ is the viscosity differential between the displaced fluid and the displacing fluid in centipoises.

Consistent with the previous discussion, the reservoir dip angle may be considered to be the greater of the geological dip of the reservoir or, in the case of completion systems such as described above with respect to the patent to Spearow, the dip angle of the line of flight between the injection and production systems.

In carrying out the present invention in a dipping reservoir, the light hydrocarbon slug is injected at a rate to provide a velocity greater than the critical velocity, $V_c$. Preferably, the hydrocarbon slug is injected at a rate sufficient to provide a darcy velocity within the reservoir which exceeds the critical velocity by an increment of at least 2 feet per day. Subsequent to the injection of the light hydrocarbon slug, the predominantly nitrogen-containing gas is injected at a rate to provide a darcy velocity which is less than critical velocity as defined by relationship (1). Preferably, the velocity of the injected nitrogenous gas is less than the critical velocity by a velocity increment of at least 0.2 feet per day. Subsequent to the injection of the desired quantity of predominantly nitrogen containing gas, the process may be carried to completion by the continued injection of nitrogen or by a different driving agent as described previously.

While the foregoing description of the process of our invention includes numerous specific illustrated embodiments, this is done for the purpose of complete disclosure only and is not intended to be limitative or restrictive of the process of our invention, since many variations of the specific disclosures contained above will be apparent to persons skilled in the art without departing from the true spirit and scope of our invention. It is our intention that our invention be limited and restricted only by those limitations and restrictions appearing in the claims appending immediately hereinafter below.

We claim:

1. In a method for the recovery of oil from a subterranean oil reservoir penetrated by spaced injection and production systems, the steps comprising:
   (a) injecting into said reservoir via said injection system a light hydrocarbon slug at a rate sufficient to cause fingering of said light hydrocarbon through the oil in said reservoir to formulate a mixture of said light hydrocarbon and said reservoir oil adjacent said injection system,
   (b) thereafter, injecting into said reservoir via said injection system a predominantly nitrogen-containing gas at a rate to produce a flow velocity which is less than the flow velocity of said light hydrocarbon slug and in an amount sufficient to strip previously-injected light hydrocarbon from said reservoir oil to form a transition zone of conditional miscibility;
   (c) injecting a driving fluid into said reservoir via said injection system to drive said transition zone through said reservoir and displace oil to said production system; and
   (d) recovering oil from said production system.

2. The method of claim 1 wherein light hydrocarbon is injected at a rate sufficient to produce a velocity in said reservoir of at least 5 feet per day.

3. The method of claim 1 wherein said light hydrocarbon slug is injected in an amount within the range of 0.01–0.02 pore volume of said reservoir.

4. The method of claim 1 wherein said light hydrocarbon is injected into said reservoir in an amount equivalent to the pore volume amount of said reservoir within a radial distance of 15–40 feet from said injection system.

5. The method of claim 1 wherein said nitrogen-containing gas is injected at a rate to provide a flow velocity in said reservoir within the range of 0.5–1.0 feet per day.

6. The method of claim 1 wherein said nitrogen containing gas is injected in an amount of at least 0.2–0.4 pore volume of said reservoir.

7. The method of claim 1 wherein said predominantly nitrogen containing gas contains at least 75% nitrogen.

8. The method of claim 7 wherein said gas is flue gas.

9. The method of claim 7 wherein said gas is substantially pure nitrogen.

10. The method of claim 1 wherein said light hydrocarbon is selected from the group consisting of $C_2$–$C_6$ hydrocarbons and mixtures thereof.

11. The method of claim 1 wherein said light hydrocarbon has an average molecular weight within the range of 40–60.

12. The method of claim 1 wherein the drive fluid is gaseous.

13. The method of claim 12 wherein the gaseous drive fluid is air.

14. The method of claim 1 wherein the drive fluid comprises alternating cycles of gas and water.

15. The method of claim 14 wherein the water contains a viscosity increasing polymer.

16. In a method for the recovery of oil from a subterranean oil reservoir having a dip of at least 10 degrees and penetrated by space injection and production systems, the steps comprising:
   (a) injecting into said reservoir via said injection system at a location up dip from said production system a light hydrocarbon slug at a rate sufficient to produce a flow velocity in said reservoir which is in excess of a critical velocity, $V_c$, as defined by the relationship:

$$V_c = (2.741 \kappa \Delta\rho \sin \alpha)/\phi\Delta\mu$$

wherein:

$V_c$ is the critical velocity in feet per day,
$\kappa$ is the permeability of the reservoir in darcies,
$\phi$ is the fractional porosity of the reservoir $= \phi_r(1-S_{wr}S_{or})$,
$\phi_r$ is the porosity of the reservoir,
$S_{wr}$ is the residual water satuaration, $S_{or}$ is the residual oil saturation, $\alpha$ is the dip angle of the reservoir in degrees, $\Delta\rho$ is the density differential between the displaced, fluid and the displacing fluid in grams per cubic centimeter, and $\Delta\mu$ is the viscosity differential between the displaced fluid and the displacing fluid in centipoises.

(b) thereafter, injecting into said reservoir via said injection system a predominantly nitrogen containing gas at a rate to produce a flow velocity which is less than said critical velocity and in an amount sufficient to strip previously injected light hydrocarbon from said reservoir oil to form a transition zone of conditional miscibility.

(c) injecting a gaseous driving fluid into said reservoir via said injection system to drive said transition zone through said reservoir and displace oil to said production system and, (d) recovering oil from said production system.

17. The method of claim 16 herein the velocity of said light hydrocarbon slug exceeds said critical velocity by a factor of at least 2.

18. The method of claim 17 wherein the velocity of said nitrogen containing gas is less than said critical velocity by an increment of at least 0.2 feet per day.

19. The method of claim 16 wherein said light hydrocarbon slug is injected in an amount within the range of 0.01-0.02 pore volume of said reservoir.

20. The method of claim 16 wherein said light hydrocarbon is injected into said reservoir in an amount equivalent to the pore volume amount of said reservoir within a radial distance of 15-40 feet from said injection system.

21. The method of claim 16 wherein said nitrogen containing gas is injected in an amount of at least 0.2 pore volume of said reservoir.

22. The method of claim 16 wherein the gaseous drive fluid is air.

23. The method of claim 16 wherein the drive fluid comprises alternating cycles of gas and water.

24. The method of claim 23 wherein the water contains a viscosity-increasing polymer.

* * * * *